Sept. 16, 1941.  R. R. ZIEGLER  2,256,306
CIRCULAR SHEAR FOR SHEARING CIRCULAR METAL PLATES
Filed July 31, 1940
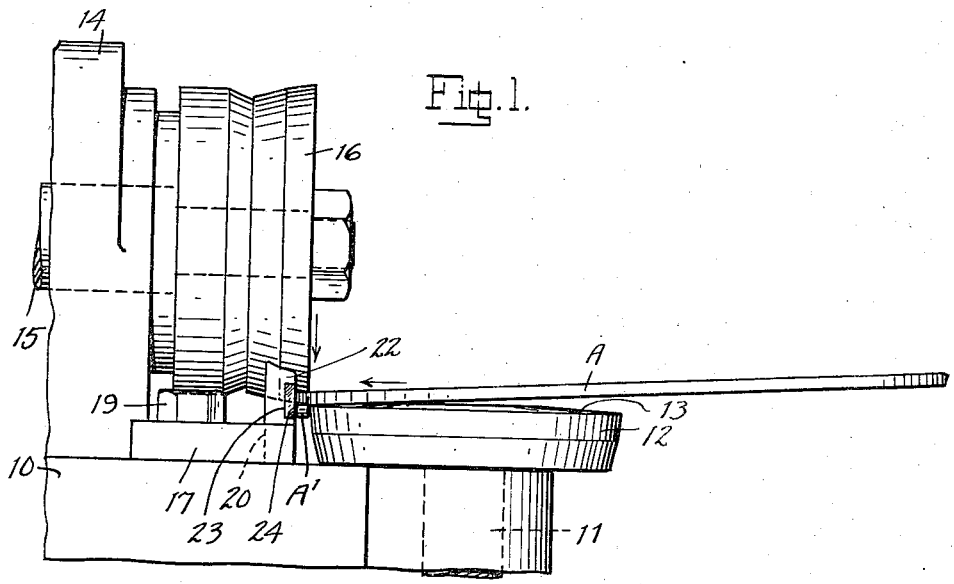
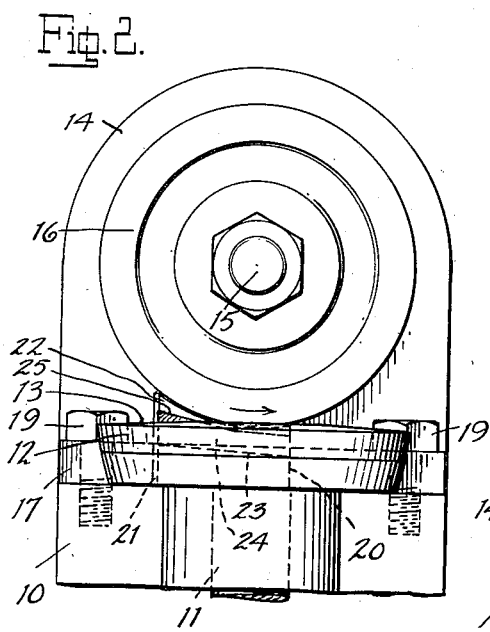
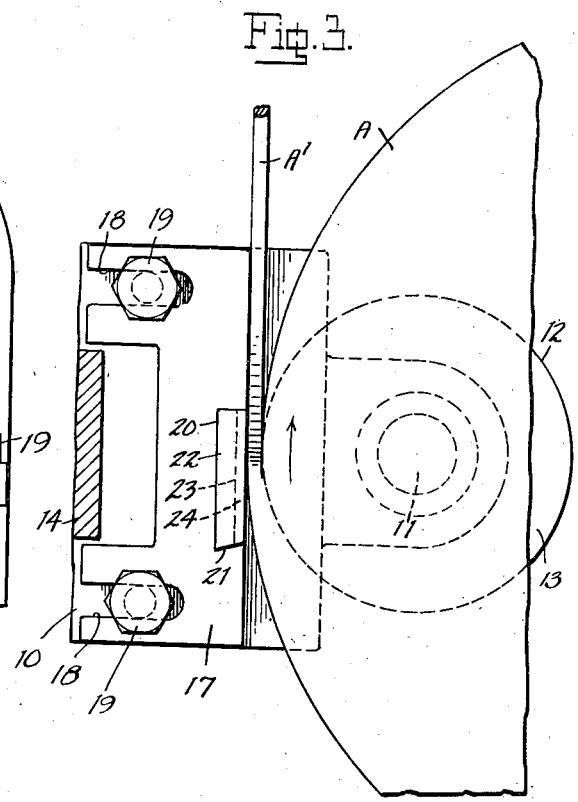
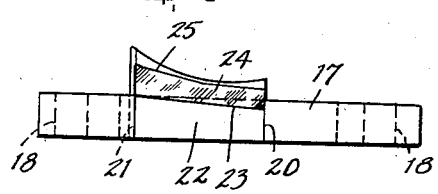
INVENTOR
ROBERT RUSSELL ZIEGLER.
BY
ATTORNEY Patented Sept. 16, 1941

2,256,306

UNITED STATES PATENT OFFICE 2,256,306

CIRCULAR SHEAR FOR SHEARING CIRCULAR METAL PLATES

Robert Russell Ziegler, Nutley, N. J., assignor to Encor Corporation, Belleville, N. J., a corporation of New Jersey Application July 31, 1940, Serial No. 348,653

9 Claims. (Cl. 164—60)

The present invention relates to an improvement in circular shears for shearing circular metal plates, this shear being particularly of the type intended to cut an annular centrifugally cast and rolled metal plate having a central hole therein by a spiral cut extending from the outer periphery to the inner periphery into a continuous length of wire of substantially rectangular cross-section. In practice this rectangular cross-section sheared wire is drawn into finished wire or rolled into strip stock. The rectangular cross-section of the sheared length of wire which may be square or oblong results from the fact that the upper and lower surfaces of the circular plate are parallel and the shear cut is substantially at right angles to these surfaces. It is extremely important in the cutting of the wire from the plate that the sheared surface be as smooth as possible and free from longitudinal gouges, ribs or the like, which may appear as grooves, cracks, overlaps, and the like in the finished drawn wire or rolled strip. It is also important that the width of the cut be accurate and uniform, as the width of the cut must be accurately controlled with respect to the thickness of the plate in order to predetermine the desired cross-sectional shape of the cut wire.

Considerable trouble and expense has been involved with previously known circular shears in maintaining these conditions to a degree, because the fixed stop and guide member of the shear which supports the circular plate as it is being cut by the rotating circular shear elements becomes rapidly worn and gouged, and built up with particles of metal, due to the fact that this member bears the brunt of the cutting action on the sheared material, the edge of the plate being sheared being pressed against the stop and guide member with great inward pressure, while it is at the same time being forced longitudinally against extreme frictional resistance and strain. In the case of relatively hard metals being sheared the metal itself will produce rough parts in the stop member which will thereupon gouge and groove the sheared surfaces of the wire with the result that this condition becomes increasingly serious and pronounced as the cutting continues. In addition to the gouging effect upon the metal and the deterioration of the stop member itself the abrasive frictional resistance gradually increases, putting extreme strain on the shear members and retarding the action of the machine. Consequently it has been necessary to replace the stop members after a very short period of operation of the machine, or refinish them, and this has been not only expensive and time consuming, but required resetting of the stop member every time it was replaced. Unless great care was exercised in the resetting operation, variations in the wire size would result. Ordinary materials, even as hard as hardened tool steel or high speed steel cannot successfully withstand these conditions and soon wear and build up with the material being sheared.

It is an object of the present invention to provide a stop and guide member which will obviate these conditions, and to this end I have discovered that the combined effects of the cutting strain, friction resistance and abrasive action upon the stop and guide member by the material being cut can be withstood by providing at the contact point an insert of a substance which will not only withstand the load strain but will provide a smooth, friction reducing surface, which while supporting the edge of the plate solidly will enable it to move with substantial freedom over its surface, and thus a smooth accurate cut may be made, and the expense and labor of constantly replacing or refinishing of the stop and guide member saved.

It is proposed to provide such insert in the main body of the stop member so that the advantages of substantial size, rugged construction, and economy of manufacture may be maintained, while a relatively small insert of the strain-receiving, friction-reducing material is incorporated at the point of contact of the metal plate therewith.

It is further proposed to provide an assembly between the insert and the stop and guide member through which the insert may be secured in place without the necessity for screws or other attaching means which would tend to weaken the substance, and which will retain the insert against the strain of the metal plate as it moves in frictional contact therewith. It is also proposed to shape and arrange the direction of the insert in such relation to the direction of strain that the force of the strain will be received and withstood with maximum efficiency.

I have found that a desirable material for the purpose of my invention is one of the cemented carbides, such as tungsten carbide or tantalum carbide, which has been found to possess the desired characteristics to a high degree, and also such hard substances as Stellite, which has also been found to produce satisfactory results.

With the above and other objects in view, an embodiment of the invention is shown in the accompanying drawing, and this embodiment will be hereinafter more fully described with reference thereto, and the invention will be finally pointed out in the claims.

In the drawing:

Fig. 1 is a side elevation of a circular shear, according to the exemplary illustrated embodiment of the invention, portions of the machine, the illustration of which is not necessary to the disclosure, being broken away.

Fig. 2 is a front elevation.

Fig. 3 is a sectional plan view, the vertical shear member not being shown.

Fig. 4 is a detail front elevation of the stop and guide member, according to the invention, removed from the machine.

Similar reference characters indicate corresponding parts throughout the several figures of the drawing.

Referring to the drawing, the circular shear, according to the exemplary illustrated embodiment of the invention, comprises a base member 10 in the forward portion of which there is journaled, for rotation about a vertical axis, the shaft 11 of the horizontal circular shear member 12, the upper surface of which is inclined downwardly and outwardly to a slight degree at its outer marginal portion, as at 13, to provide a slightly inclined support for the edge of the circular plate A to be sheared. An upright bearing standard 14 is mounted upon the base in rearwardly spaced relation to the circular shear 12 and has journaled therein the horizontal shaft 15 of the vertical shear member 16, the edge of which is contiguous at the cutting point to the edge of the horizontal circular shear member 12. The two circular shear members 12 and 16 are adapted to be driven by suitable mechanism, so that they are rotated simultaneously in opposite directions, that is, the shear 16 is rotated in counter-clockwise direction while the shear 12 is rotated in clockwise direction, their contiguous cutting edges thus moving together in the same direction. While the axes of the horizontal shear 12 and the vertical shear 16 are shown substantially in the same vertical plane, they will be slightly offset in practice, that is the axis of the horizontal shear 12 will be slightly to the left of the vertical plane of the axis of the vertical shear 16 as seen in Fig. 2, so that as the two shears rotate toward each other the horizontal shear tends to turn the plate A into engagement with the contact strip beneath the vertical shear. The greater the offset between the two shears, the greater the pressure exerted against the contact strip, and consequently this offset may be determined in setting up the machine, depending upon the characteristics of the metal being sheared, it being understood that suitable means may be provided for adjusting the relative positions of the bearing portions 10 and the standard 14.

Upon the base 10 there is mounted for inward and outward adjustment the base member 17 of the guide and stop member of the machine, this member being provided with parallel slots 18 at its ends engaged by cap-screws 19 screwed into the base 10 to secure the adjusted position. At the forward edge of the base member 17 there is provided a recess 20 having a dovetail form at one end, as at 21, and in which is engaged an upstanding guide and stop element 22, the upper surface of which is curved in surrounding concentric relation to the circular shear 16. This member 22 is disposed in opposed spaced relation to the cutting edge of the horizontal circular shear member 12 and, as shown clearly in Figs. 1 and 3, supports of the edge of the circular plate A being cut as the ribbon of cut wire $A^1$ is sheared downwardly from the body of the plate. The plate A is rotated with the circular shear members due to the fact that its marginal portion is pressed against the inclined surface 13, the plate being at the same time forced inwardly against the guide member. As the cutting operation continues the plate 12 is spirally cut into a continuous length of rectangular cross-section wire.

The stop and guide element 22 is provided in its face with a slot 23 in which is engaged the insert contact strip 24, the slot 23 being slightly inclined downwardly in the direction in which the cut wire moves and its upper wall being inclined upwardly and rearwardly along its rearward portion as at 25, so that the insert strip may be slipped in from the rearward end of the slot and will thereupon be wedgingly locked against forward displacement. Consequently the frictional engagement of the edge of the plate therewith tends to more securely retain the insert in place, and without the necessity for providing it with securing means, such as screws or the like, which would tend to weaken its structure.

The insert contact member is formed of a hard substance, which will not be gouged by the edge of the plate and will provide a relatively smooth friction reducing abrasion resistant surface against which the edge of the plate A moves. This substance is preferably one of the cemented carbides, such as tungsten carbide or tantalum carbide, or it may be Stellite or other similar material. The width of the cut is determined by the spacing of the face of this insert from the cutting edge of the horizontal circular shear member 12, and when the base 17 is adjustably secured to the desired position this dimension will be accurately maintained during the operation of the machine, without tendency to become changed through gouging of the insert or through shifting of the strip member because of excessive strain thereon, the smooth friction reducing engagement of the edge of the plate with the insert reducing strain thereon, and the tendency to vibrate or chatter. The hard smooth close-grained surface of the insert is such that it will not retain and build up particles of metal from the sheared surface, thus insuring a smooth cut free from gouges.

I have illustrated and described a preferred and satisfactory embodiment of the invention, but it will be understood that changes may be made therein, within the spirit and scope thereof, as defined in the appended claims.

Having thus described my invention, what I claim and desire to secure by Letters Patent is:

1. In a circular shear for shearing circular plates into a continuous strip, a rotatable lower circular shear member adapted to engage the under-surface of the plate being sheared adjacent its edge, and a rotatable upper circular shear member having its edge contiguous to the edge of said lower shear member at the cutting point and adapted to engage the upper surface of said plate adjacent its edge outwardly of the point of engagement by the lower shear member, and a stop and guide member adjustably mounted beneath said upper shear member in laterally spaced relation to the cutting edge of said lower shear member to support and guide the edge of said plate during shearing, the spacing of said stop and guide member from said lower shear member determining the width of the shear cut, the contact face of said stop and guide member comprising a material characterized by its extreme hardness and friction reducing and abrasion resistant qualities.

2. In a circular shear for shearing circular plates into a continuous strip, a rotatable lower circular shear member adapted to engage the under-surface of the plate being sheared adjacent its edge, and a rotatable upper circular shear member having its edge contiguous to the edge of said lower shear member at the cutting point and adapted to engage the upper surface of said plate adjacent its edge outwardly of the point of engagement by the lower shear member, a stop and guide member adjustably mounted beneath said upper shear member in laterally spaced relation to the cutting edge of said lower shear member to support and guide the edge of said plate during shearing, the spacing of said stop and guide member from said lower shear member determining the width of the shear cut, and an insert contact member carried by said stop and guide member comprising a material characterized by its extreme hardness and friction reduction and abrasion resistant qualities.

3. In a circular shear for shearing circular plates into a continuous strip, a rotatable lower circular shear member adapted to engage the under-surface of the plate being sheared adjacent its edge, and a rotatable upper circular shear member having its edge contiguous to the edge of said lower shear member at the cutting point and adapted to engage the upper surface of said plate adjacent its edge outwardly of the point of engagement by the lower shear member, a stop and guide member adjustably mounted beneath said upper shear member in laterally spaced relation to the cutting edge of said lower shear member to support and guide the edge of said plate during shearing, the spacing of said stop and guide member from said lower shear member determining the width of the shear cut, the face of said stop and guide member having a recess therein extending substantially in the same direction as the direction of movement of the strip which is cut from said plate, and an insert contact member disposed in said recess adapted to be engaged by the edge of the moving plate as it is cut.

4. In a circular shear for shearing circular plates into a continuous strip, a rotatable lower circular shear member adapted to engage the under-surface of the plate being sheared adjacent its edge, and a rotatable upper circular shear member having its edge contiguous to the edge of said lower shear member at the cutting point and adapted to engage the upper surface of said plate adjacent its edge outwardly of the point of engagement by the lower shear member, a stop and guide member adjustably mounted beneath said upper shear member in laterally spaced relation to the cutting edge of said lower shear member to support and guide the edge of said plate during shearing, the spacing of said stop and guide member from said lower shear member determining the width of the shear cut, the face of said stop and guide member having a recess therein extending in an inclined direction corresponding substantially to the direction of movement of the strip which is cut from said plate, and an insert contact member disposed in said recess adapted to be engaged by the edge of the moving plate as it is cut.

5. In a circular shear for shearing circular plates into a continuous strip, a rotatable lower circular shear member adapted to engage the under-surface of the plate being sheared adjacent its edge, and a rotatable upper circular shear member having its edge contiguous to the edge of said lower shear member at the cutting point and adapted to engage the upper surface of said plate adjacent its edge outwardly of the point of engagement by the lower shear member, a stop and guide member adjustably mounted beneath said upper shear member in laterally spaced relation to the cutting edge of said lower shear member to support and guide the edge of said plate during shearing, the spacing of said stop and guide member from said lower shear member determining the width of the shear cut, the face of said stop and guide member having a recess therein extending substantially in the same direction as the direction of movement of the strip cut from said plate and diverging toward its end disposed in the opposite direction from the direction of movement of said strip, and an insert contact member engaged in said recess corresponding in shape thereto and adapted through the engagement of the edge of the moving plate therewith to be wedgingly retained in said recess.

6. In a circular shear for shearing circular plates into a continuous strip, a rotatable lower circular shear member adapted to engage the under-surface of the plate being sheared adjacent its edge, and a rotatable upper circular shear member having its edge contiguous to the edge of said lower shear member at the cutting point and adapted to engage the upper surface of said plate adjacent its edge outwardly of the point of engagement by the lower shear member, a stop and guide member adjustably mounted beneath said upper shear member in laterally spaced relation to the cutting edge of said lower shear member to support and guide the edge of said plate during shearing, the spacing of said stop and guide member from said lower shear member determining the width of the shear cut, and a contact member carried by the face of said stop and guide member consisting of one of the cemented carbides.

7. In a circular shear for shearing circular plates into a continuous strip, a rotatable lower circular shear member adapted to engage the under-surface of the plate being sheared adjacent its edge, and a rotatable upper circular shear member having its edge contiguous to the edge of said lower shear member at the cutting point and adapted to engage the upper surface of said plate adjacent its edge outwardly of the point of engagement by the lower shear member, a stop and guide member adjustably mounted beneath said upper shear member in laterally spaced relation to the cutting edge of said lower shear member to support and guide the edge of said plate during shearing, the spacing of said stop and guide member from said lower shear member determining the width of the shear cut, and a contact member carried by the face of said stop and guide member consisting of tungsten carbide.

8. In a circular shear for shearing circular plates into a continuous strip, a rotatable lower circular shear member adapted to engage the under-surface of the plate being sheared adjacent its edge, and a rotatable upper circular shear member having its edge contiguous to the edge of said lower shear member at the cutting point and adapted to engage the upper surface of said plate adjacent its edge outwardly of the point of engagement by the lower shear member, a stop and guide member adjustably mounted beneath said upper shear member in laterally spaced relation to the cutting edge of said lower shear member to support and guide the edge of said plate during shearing, the spacing of said stop and guide member from said lower shear member determining the width of the shear cut, and a contact member carried by the face of said stop and guide member consisting of tantalum carbide.

9. In a circular shear for shearing circular plates into a continuous strip, a rotatable lower circular shear member adapted to engage the under-surface of the plate being sheared adjacent its edge, and a rotatable upper circular shear member having its edge contiguous to the edge of said lower shear member at the cutting point and adapted to engage the upper surface of said plate adjacent its edge outwardly of the point of engagement by the lower shear member, a stop and guide member adjustably mounted beneath said upper shear member in laterally spaced relation to the cutting edge of said lower shear member to support and guide the edge of said plate during shearing, the spacing of said stop and guide member from said lower shear member determining the width of the shear cut, and a contact member carried by the face of said stop and guide member consisting of Stellite.

ROBERT RUSSELL ZIEGLER.